United States Patent
Zamir et al.

(10) Patent No.: US 12,293,109 B2
(45) Date of Patent: May 6, 2025

(54) MEMORY DEVICE WITH REINFORCEMENT LEARNING WITH Q-LEARNING ACCELERATION

(71) Applicant: Western Digital Technologies, Inc., San Jose, CA (US)

(72) Inventors: Ran Zamir, Ramat Gan (IL); Ofir Pele, Netanya (IL); Stella Achtenberg, Netanya (IL); Omer Fainzilber, Herzeliya (IL)

(73) Assignee: Sandisk Technologies, Inc., Milpitas, CA (US)

( * ) Notice: Subject to any disclaimer, the term of this patent is extended or adjusted under 35 U.S.C. 154(b) by 1026 days.

(21) Appl. No.: 17/212,526

(22) Filed: Mar. 25, 2021

(65) Prior Publication Data

US 2022/0066697 A1 Mar. 3, 2022

Related U.S. Application Data (60) Provisional application No. 63/073,387, filed on Sep. 1, 2020.

(51) Int. Cl.
*G06F 3/06* (2006.01)
*G06N 20/00* (2019.01)

(52) U.S. Cl.
CPC .......... *G06F 3/0659* (2013.01); *G06F 3/0611* (2013.01); *G06F 3/0673* (2013.01); *G06N 20/00* (2019.01)

(58) Field of Classification Search
CPC .... G06F 3/0659; G06F 3/0611; G06F 3/0673; G06N 20/00
See application file for complete search history.

(56) References Cited

U.S. PATENT DOCUMENTS

| | | | |
|---|---|---|---|
| 2013/0173847 A1* | 7/2013 | Sprouse | G11C 7/1012 711/E12.008 |
| 2016/0162353 A1* | 6/2016 | Manohar | H03M 13/27 714/760 |
| 2016/0358663 A1* | 12/2016 | Li | G11C 16/3431 |
| 2017/0261949 A1* | 9/2017 | Hoffmann | G06N 7/01 |
| 2019/0184564 A1* | 6/2019 | Muraoka | B25J 9/1633 |

(Continued)

OTHER PUBLICATIONS

Spano, Sergio, et al. "An efficient hardware implementation of reinforcement learning: The q-learning algorithm." Ieee Access 7 (2019): 186340-186351. (Year: 2019).*

(Continued)

*Primary Examiner* — Paulinho E Smith
(74) *Attorney, Agent, or Firm* — PATTERSON + SHERIDAN, LLP (57) ABSTRACT

The present disclosure generally relates to data storage devices, such as solid state drives. A data storage device includes a controller, one or more volatile memory locations, and one or more non-volatile memory locations. Computations, including reinforcement learning algorithms, may be completed by the controller using the one or more non-volatile memory locations. Data associated with reinforcement learning is stored in a table on one or more planes of the non-volatile memory, where the results from the computations update the table with the relevant values. The data in the table are aligned to one or more wordlines, such that sensing the wordline senses all the data stored in the table.

18 Claims, 6 Drawing Sheets

(56) References Cited

U.S. PATENT DOCUMENTS

2020/0294598 A1* 9/2020 Louie .................. G11C 16/08
2022/0036164 A1* 2/2022 Kale .................... G06N 3/049

OTHER PUBLICATIONS

Hasselt, Hado. "Double Q-learning." Advances in neural information processing systems 23 (2010). (Year: 2010).*
Reinforcement learning, from Wikipedia, https://en.wikipedia.org/wiki/Reinforcement_learning, last accessed Mar. 25, 2021, 13 pp.
Silver, et al., A General Reinforcement Learning Algorithm that Masters Chess, Shogi and Go through Self-Play, https://discovery.ucl.ac.uk/id/eprint/10069050/1/alphazero_preprint.pdf, 2018, 32 pp.
Van Hasselt, et al., Deep Reinforcement Learning with Double Q-Learning, https://arxiv.org/abs/1509.06461, 2015, 13 pp.
Carvalho, et al., Autonomous Power Management in Mobile Devices Using Dynamic Frequency Scaling and Reinforcement Learning for Energy Minimization, Microprocessors and Microsystems, vol. 64, Feb. 2019, pp. 205-220.
Q-learning, from Wikipedia, https://en.wikipedia.org/wiki/Q-learning, last access Mar. 25, 2021, 8 pp.
Sutton, et al., RL: Introduction, Second Edition, p. 171, 2014.
Van Hasselt, Double Q-learning, https://proceedings.neurips.cc/paper/2010/hash/091d584fced301b442654dd8c23b3fc9-Abstract.html, from Advances in Neural Information Processing Systems 23 (NIPS 2010), 9 pp.

* cited by examiner

|   | 1 | 2 | 3 |   |
|---|---|---|---|---|
|   | -10 | -10 | -10 |   |
| 3 | -10 | -1 | -1 | REWARD +10 | -10 |
| 2 | -10 | +1 | -1 | +1 | -10 |
| 1 | -10 | START 0 (202) | 0 | 0 | -10 |
|   | -10 | -10 | -10 |   |

| POSITION / MOVE | (1,1) | (1,2) | (1,3) | (2,1) | (2,2) | (2,3) | (3,1) | (3,2) |
|---|---|---|---|---|---|---|---|---|
| LEFT | -10 | -10 | -10 | 0 | +1 | -1 | 0 | -1 |
| RIGHT | 0 | -1 | -1 | 0 | +1 | END +10 | -10 | -10 |
| UP | 1 | -1 | -10 | -1 | -1 | -10 | +1 | END +10 |
| DOWN | -10 | 0 | +1 | -10 | 0 | -1 | -10 | 0 |

MEMORY DEVICE WITH REINFORCEMENT LEARNING WITH Q-LEARNING ACCELERATION

CROSS-REFERENCE TO RELATED APPLICATIONS

This application claims benefit of U.S. provisional patent application Ser. No. 63/073,387, filed Sep. 1, 2020, which is herein incorporated by reference.

BACKGROUND OF THE DISCLOSURE

Field of the Disclosure

Embodiments of the present disclosure generally relate to data storage devices, such as solid state drives (SSDs).

Description of the Related Art

Data storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. The data is read and written to one or more blocks in the memory device. Each of the one or more blocks comprises one or more planes, where each of the one or more planes comprises one or more pages. Data storage devices may be utilized for reinforcement learning (RL) applications, such as to store and perform calculations for the RL applications.

RL is an area of machine learning concerned with how software agents ought to take actions in an environment in order to maximize the notion of cumulative reward. RL may be utilized in machine learning (ML) and artificial intelligence (AI) applications. RL has achieved super-human performance in strategy board games, such as Go, and in Atari games, such as Video Pinball and Atlantis. RL is a promising area of machine learning for edge applications, such as autonomous power management in mobile devices. For example, the device, such as the mobile device, may be required to respond to a RL decision and update the device protocols based on the RL decision. The RL algorithms, in many instances, require large amounts of memory and large amounts of power consumption due to the amount of memory utilized and the computational power required. Furthermore, the RL algorithms may be implemented as software and completed by the CPU or the GPU.

Therefore, what is needed is an improved method of operating a data storage device, with respect to reinforcement learning, that improves system performance, power consumption, and the cost associated with the data storage device.

SUMMARY OF THE DISCLOSURE

The present disclosure generally relates to data storage devices, such as solid state drives. The data storage device comprises a controller, one or more volatile memory locations, and one or more non-volatile memory locations. Computations, such as the reinforcement learning algorithms, may be completed by the controller or the one or more non-volatile memory locations. The data associated with reinforcement learning is stored in a table on one or more planes of the non-volatile memory, where the results from the computations updates the table with the relevant values. The data in the table are aligned to one or more wordlines, such that sensing the one or more wordline senses all the data stored in the table.

In one embodiment, a data storage device includes a memory device and a controller coupled to the memory device. The controller is configured to receive Q table data from the memory device, execute a Q-learning algorithm to create updated Q table data, and write the updated Q table data to a Q table in the memory device.

In another embodiment, a data storage device includes a memory device, where the memory device is configured to read Q table data from the memory device, execute a Q-learning algorithm to create updated Q table data, and write the updated Q table data to the memory device. The data storage device further includes a controller coupled to the memory device.

In another embodiment, a data storage device includes a memory device, means to generate one or more Q tables, wherein each of the one or more Q tables comprises one or more states and one or more actions, means to perform a max argument calculation for the one or more of the Q tables, means to update the one or more Q tables with the results of the max argument calculation, and means to advance to the next state of the one or more Q tables.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives. The data storage device comprises a controller, one or more volatile memory locations, and one or more non-volatile memory locations. Computations, such as the reinforcement learning algorithms, may be completed by the controller or the one or more non-volatile memory locations. The data associated with reinforcement learning is stored in a table on one or more planes of the non-volatile memory, where the results from the computations updates the table with the relevant values. The data in the table are aligned to one or more wordlines, such that sensing the one or more wordline senses all the data stored in the table.

Figure 1:
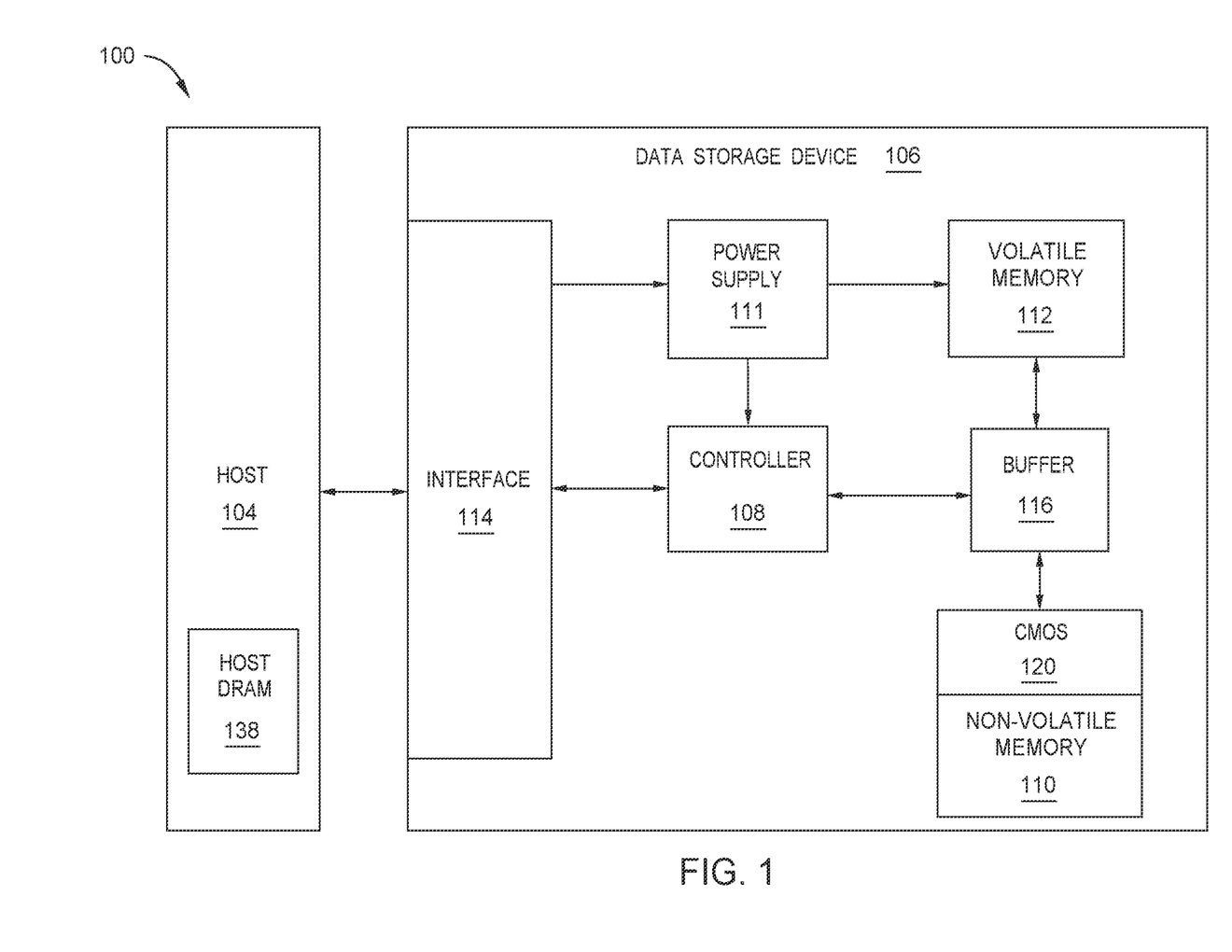
FIG. 1 is a schematic block diagram illustrating a data storage system, according to one embodiment.

FIG. 1 is a schematic block diagram illustrating a storage system 100 in which a data storage device 106 may function as a storage device for a host device 104, in accordance with one or more techniques of this disclosure. For instance, the host device 104 may utilize a non-volatile memory (NVM) 110 included in data storage device 106 to store and retrieve data. However, the host device 104 also includes its own local memory, shown as host DRAM 138. In some examples, the storage system 100 may include a plurality of data storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 communicates with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 by way of the interface 114.

In the embodiment shown, the data storage device 106 includes complementary metal-oxide-semiconductor (CMOS) logic 120 coupled to the NVM 110. The NVM 110 may include a plurality of memory devices or memory units. The CMOS logic 120 may be configured to store data such as the current date and time of the system clock and the boot sequence of the data storage device 106. The NVM 110 may be configured to store and/or retrieve data. For instance, the CMOS logic 120 may receive a message (i.e., command) from the controller 108 to write (i.e., write command) data to the NVM 110. CMOS logic 120 may receive a message from the controller 108 to read (i.e., read command) data stored on the NVM 110. In some examples, each of the memory units may be referred to as a die. In some examples, the NVM 110 may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each of the NVM 110 may include at least one of a type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices, which may comprise NAND or NOR type memory logic that store data based on a charge contained in a floating gate of a transistor for each flash memory cell. In NAND flash memory devices, the flash memory device may be divided into a plurality of blocks, which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110.

Figure 2A:
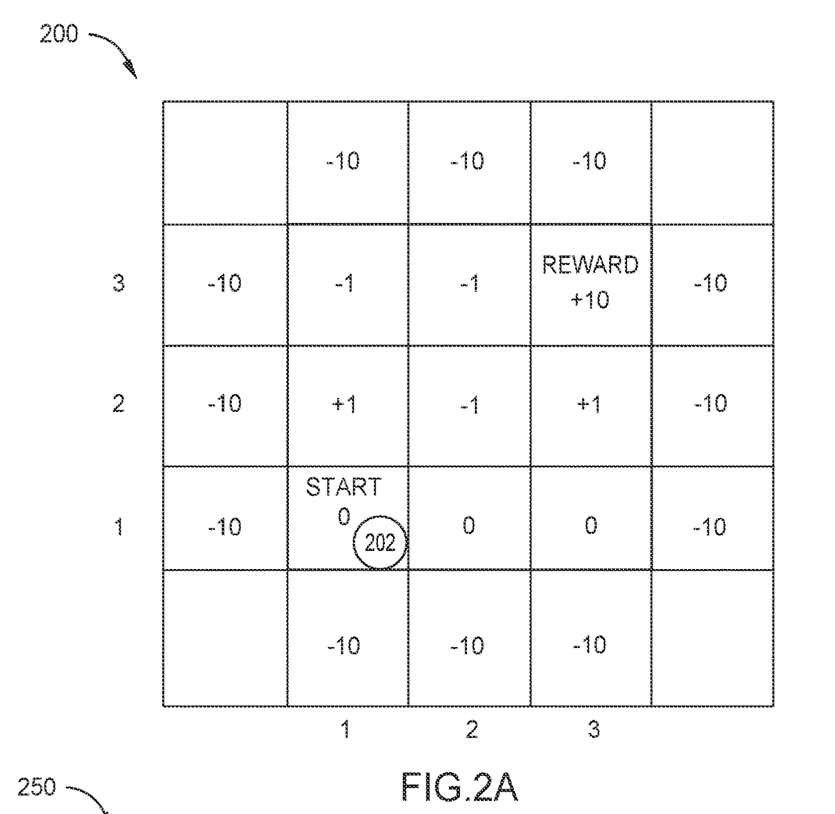
FIGS. 2A-2B are an illustration of a type of reinforcement learning, according to one embodiment.
Figure 2B:
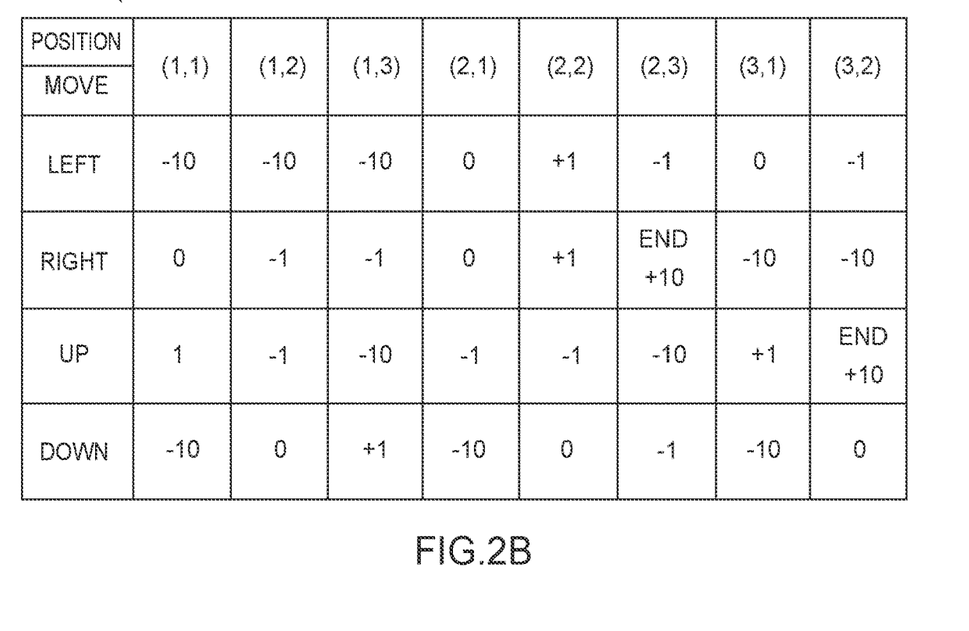

FIGS. 2A-2B are an illustration of a type of reinforcement learning, according to one embodiment. Reinforcement learning (RL) determines a balance between exploration and exploitation. Exploration is the gathering of information that may result in better future decisions and exploitation is the usage of current information (i.e., prior knowledge and the information gathered from exploration) to determine the best decision. Reinforcement learning may be modeled by the Markov decision process, where a number of environments exists for a number of states. Each of the states includes set of actions that the agent may perform. FIGS. 2A-2B illustrate a reinforcement learning algorithm that seeks to find the best action to take given the current state. Q-learning may be considered an off policy reinforcement learning algorithm because the Q-learning function learns from performing actions outside the current policy, such as performing a random action, instead of taking the current best action. In one embodiment, the reinforcement learning algorithm is Q-learning, where the "Q" in Q-learning stands for quality. Quality, in the current context, represents how useful a given action is for the cumulative future reward (including the immediate future reward). The Q-learning algorithms seek to learn a policy that maximizes the total reward.

FIG. 2A illustrates a board 200, where the board 200 includes a 3×3 set (i.e., 9 tiles) of valid tiles and an additional 12 tiles of invalid tiles. Each of the tiles of the board 200 includes a point value, where the 12 invalid tiles each has a point value of −10 and each of the 9 valid tiles has a point value of −1, 0, 1, or 10. FIG. 2B illustrates a table 250 illustrating the potential point value of moving a game chip 202 from a position of the board 200 to an adjacent position on the board 200. However, for the initial environment, the table 250 is empty. Each time the agent performs an action (e.g., moving the game chip 202 to an adjacent tile), the table 250 is filled with the relevant information (i.e., the expected cumulative future reward for taking the action). The starting position of the game is position (1,1) and the goal is to reach position (3,3), while maximizing the points gained. Furthermore, when moving to an invalid tile, the points associated with the invalid tile are assigned and the agent returns to the previous tile.

When the table 250 is initialized, the table 250 values are set according to prior knowledge. If no such knowledge is present (e.g., a first iteration of the game) the table 250 values may be set to zero. After each action occurs, the Q-values are updated in the table 250. During the start of the initial environment, the agent performs a random action, where the random action may be characterized as an exploration action. For example, the agent takes a first step from the starting position (1,1), where the first step moves the chip 202 to an invalid tile with a point value of −10. The corresponding entry in the table 250 is filled with the point value of −10 and the chip 202 returns to the previous position, position (1,1). Each time the chip 202 is moved to a new location, the cumulative points are added. For example, when the chip is moved from position (1,1) to (1,2) to (2,2), the cumulative points is calculated as 1+(−1)=0. When the table 250 fills up with updated values after multiple iterations (i.e., environments), the Q-learning algorithm begins to determine the best set of actions to achieve the largest cumulative ending point value.

The Q-learning algorithm may be calculated by the following equation:

$$Q(s_t, a_t) \leftarrow Q(s_t, a_t) + \alpha[r_{t+1} + \gamma \, \text{argmax} \, Q(s_{t+1}, a) - Q(s_t, a_t)]$$

where s is the current state, where a is the current action, where Q(s,a) is the max Q table value for all current states and actions, where r is the reward for the current action for the current state, and where γ is a discount factor. For example, when the table 250 is partially or completely filled with updated Q-values, the algorithm may determine the direction of the step that the agent should take in order to maximize the cumulative future reward (i.e., max argument calculation). In one embodiment, maximizing the current reward takes into account the cumulative reward, such as when γ greater than zero. In another embodiment, maximizing the current reward is only concerned with the current reward gain, such as when γ equals zero. After completing the Q-learning algorithm for a first state, the controller may advance compute the results for a second state using the Q-learning algorithm.

Furthermore, the Q-learning algorithm may be employed in a double Q-learning algorithm, where the double Q-learning algorithm requires less training than the Q-learning algorithm. For example, the double Q-learning algorithm utilizes two Q tables to determine the optimal action. The following equations illustrate updating a first Q value function, $Q^A$, and a second Q value function, $Q^B$.

Choose (e.g., random) either UPDATE(A) or UPDATE (B)

if UPDATE (A) then

Define $a^* = \mathrm{argmax}_a Q^A(s',a)$ $Q^A(s,a) \leftarrow Q^A(s,a) + \alpha(s,a)[r + \gamma Q^B(s',a^*) - Q^A(s,a)]$ else if UPDATE(B) then Define $b^* = \mathrm{argmax}_a Q^B(s',a)$ $Q^B(s,a) \leftarrow Q^B(s,a) + \alpha(s,a)[r + \gamma Q^A(s',a^*) - Q^B(s,a)]$ where a* is the optimal action to be taken in the next step according to the first or second Q tables ($Q^A$ or $Q^B$), where a is the action chosen at the current step, where s is the current state, where s' is the next state, where r is the immediate reward received in the current step, where γ is a discount factor, and where α(s,a) is a step size for the current state and the current action.

By utilizing the two Q value functions $Q^A$ and $Q^B$ concurrently, each Q value function receives an update from the other Q value function for the next state. For example, the update of $Q^A$ comprises finding an action a* that maximizes $Q^A$ for the next state (i.e., Q(s',a*)=argmax Q(s',a)). The resulting a* value is then utilized to calculate the value of $Q^B(s',a^*)$ in order to update $Q^A(s,a)$. Furthermore, after completing the action for a first state, the controller may advance to a second state of each of the Q tables.

Figure 3:
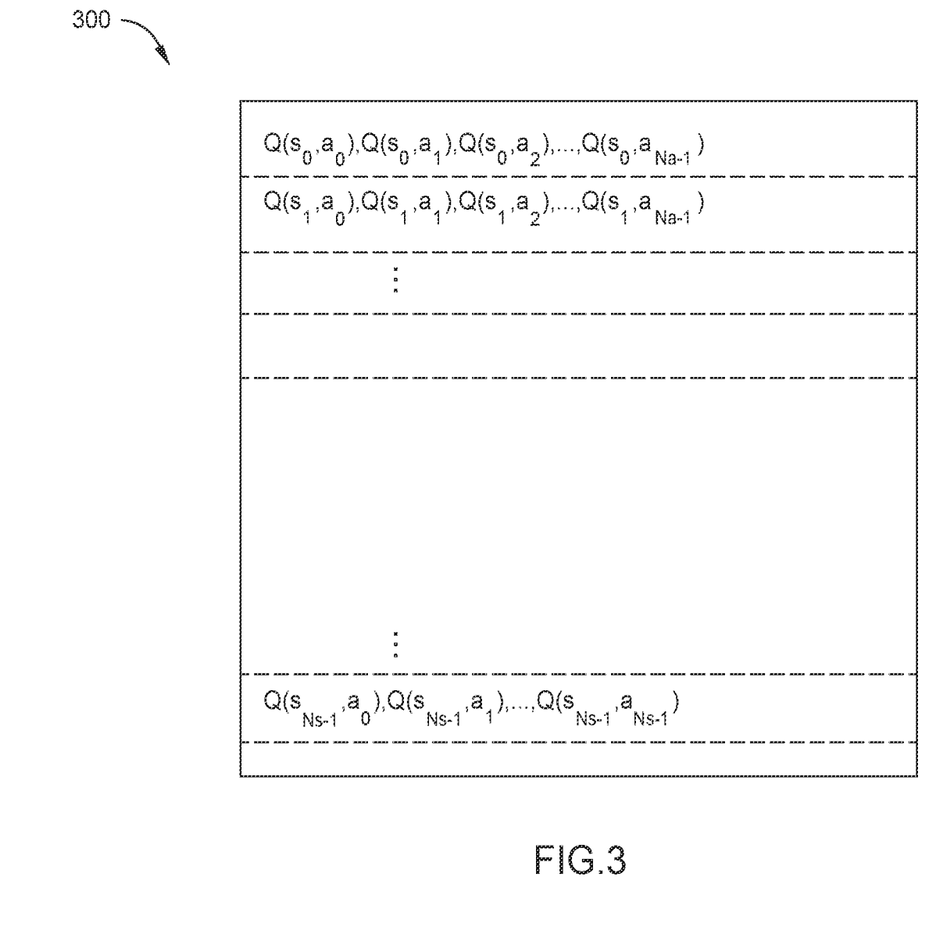
FIG. 3 is a schematic illustration of a Q table arrangement on a page of the non-volatile storage unit, according to one embodiment.

FIG. 3 is a schematic illustration of a Q table arrangement on a page 300 of the non-volatile storage unit, according to one embodiment. The Q table is a 2-dimensional table comprising values of Q(s,a) for each state and action pair. Furthermore, the one or more Q tables may store a size, a location, and a resolution of each entry. In some embodiments, the Q table may require large amounts of memory to store the data associated with each state and action pair. Each line of the page 300 may be a wordline, such that a first wordline comprises $Q(s_0,a_0)$, $Q(s_0,a_1)$, $Q(s_0,a_2)$, and so-forth. Furthermore, Na represents the number of actions and Ns represents the number of states. By arranging the one or more actions for a state, such as a first state, along a wordline, all the data for the first state may be received by sensing the first wordline. Furthermore, the data of the Q table may be aligned to each memory location size of about 4 KB or to each page unit.

Figure 4A:
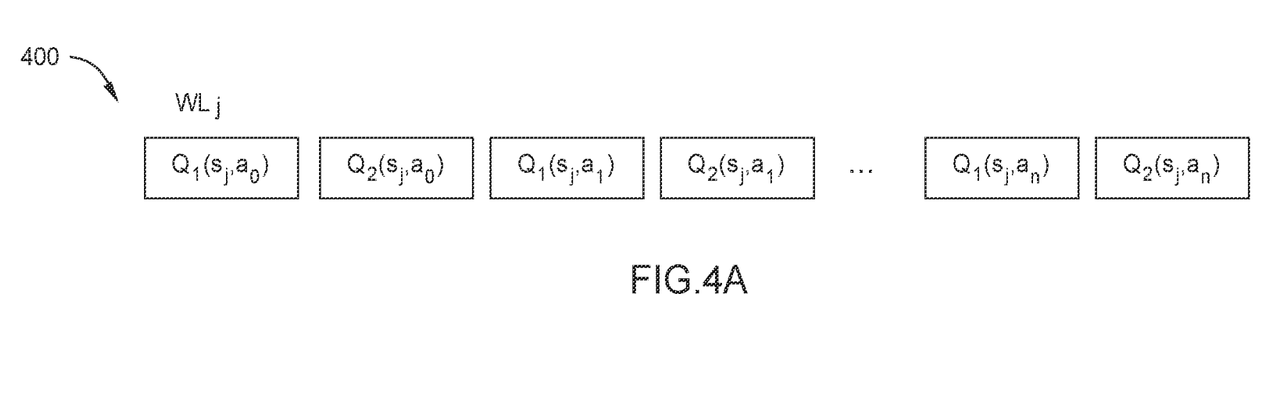
FIGS. 4A-4B are schematic illustration of one or more Q tables arranged on a wordline, according to various embodiments.

FIG. 4A is a schematic illustration of one or more Q tables arranged on a wordline, according to one embodiment. In FIG. 4A, a wordline (WL) j comprises a first Q table, $Q_1(s,a)$, and a second Q table, $Q_2(s,a)$. The first Q table and the second Q table are alternating on the WL j, where j represents a state, such as the first state. The WL j is located on a single plane, such as a first plane of a first die. Because both the first and the second Q tables are arranged on the WL j, sensing the WL j retrieves all the data on the wordline, such that the first and the second Q tables are read. For a NVM page size of about 16 KB, a plurality of Q value entries (i.e., $Q_1(s_N,a_M)$ and $Q_2(s_N,a_M)$) may be programmed to the NVM page, such as the page 300 of FIG. 3. Each of the entries on the WL j may be related to the different possible actions that may be selected in the state j.

Figure 4B:
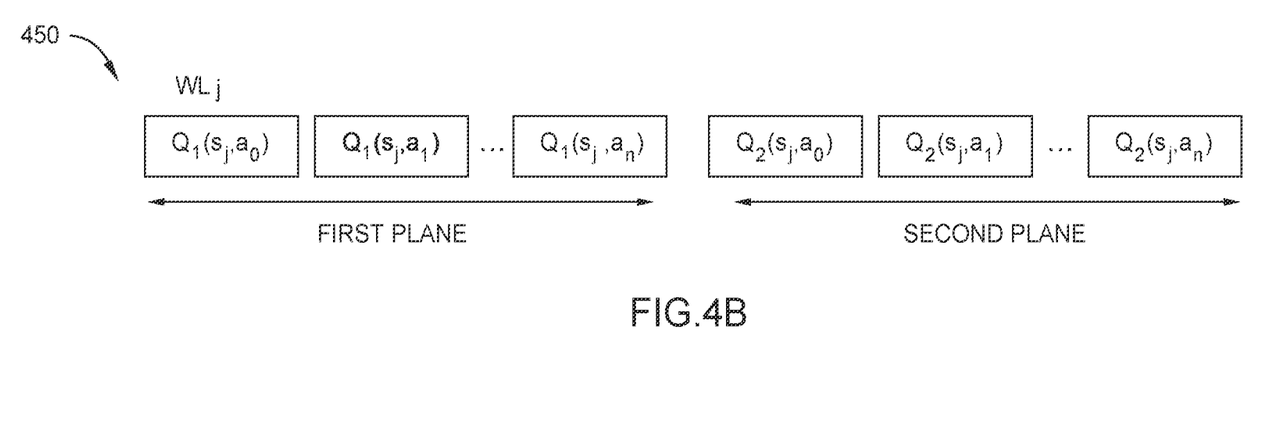

FIG. 4B is a schematic illustration of one or more Q tables arranged on a wordline, according to another embodiment. In FIG. 4B, a wordline (WL) j comprises a first Q table, $Q_1(s,a)$, and a second Q table, $Q_2(s,a)$. The first Q table and the second Q table located on different planes of the WL j, where j represents a state, such as the first state. The first Q table is located on a first plane and the second Q table is located on a second plane. However, since the first and the second Q tables are on the same wordline, WL j, sensing the WL j retrieves all the data on the wordline from both the first plane and the second plane. For a NVM page size of about 16 KB, a plurality of Q value entries (i.e., $Q_1(s_N,a_M)$ and $Q_2(s_N,a_M)$) may be programmed to the NVM page, such as the page 300 of FIG. 3. Each of the entries on the WL j may be related to the different possible actions that may be selected in the state j.

Figure 5A:
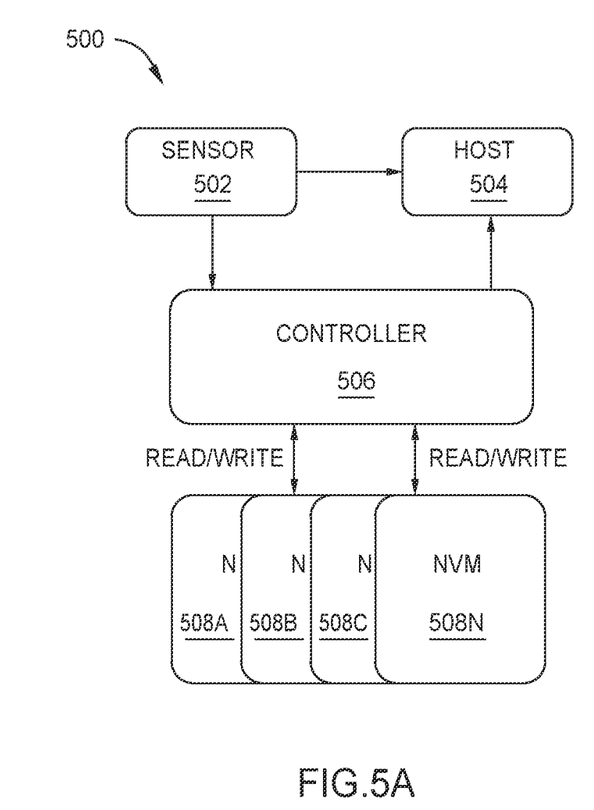
FIGS. 5A-5B are schematic block diagrams illustrating a data storage system architectures, according to various embodiments.
Figure 5B:
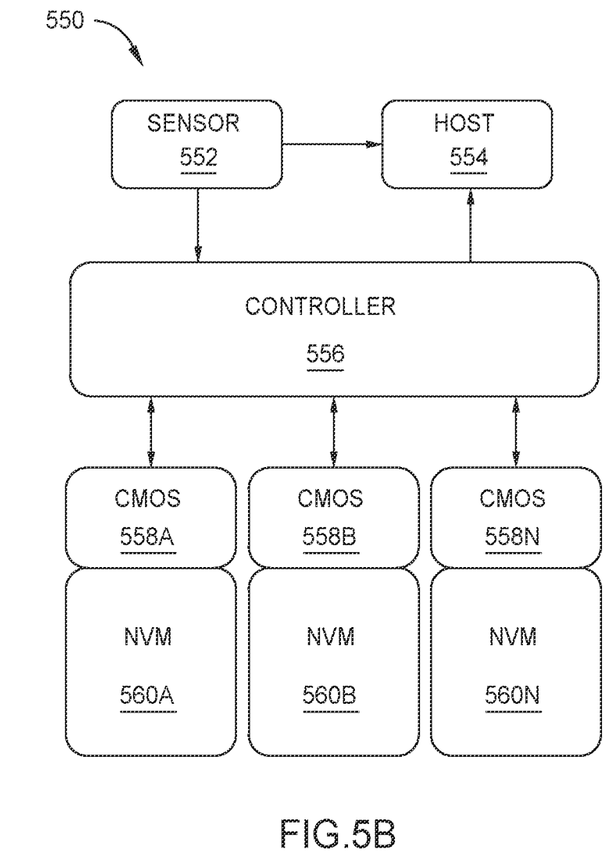

In the description herein, the data storage system architectures 500, 550 of FIGS. 5A and 5B are not intended to be limiting, but to provide an example of possible embodiments. For example, in the data storage system architectures 500, 550, the sensors 502 may be coupled to the host 504 instead of the controller 506 and the sensor 552 may be coupled to the host 554 instead of the controller 556. When the sensor 502, 552 is coupled to the host 504, 554 instead of the controller 506, 556, the host 504, 554 passes the current state information to the controller 506, 556. However, in the embodiments described in FIGS. 5A and 5B, the sensor 502, 552 is coupled to the controller 506, 556. Thus, the sensor 502, 552 provides the controller 506, 556 with the current state information. Furthermore, the plurality of NVMs be referenced by a common number herein, for exemplary purposes. For example, the plurality of NVMs 508A-508N may be collectively referred to as the NVMs 508.

FIG. 5A is a schematic block diagram illustrating a data storage system architecture 500, according to one embodiment. The data storage system architecture 500 includes a sensor 502, a host 504, a controller 506, and a plurality of NVMs 508A-508N. The controller 506 and the NVMs 508 form a data storage device, such as the data storage device 106 of FIG. 1. The sensor 502 provides the controller 506 with the current environment, where the controller 506 performs calculations for each state and corresponding action in order to achieve the maximum future cumulative reward for the current state in the current environment. As shown in FIG. 5A, the sensor 502 may be connected to either the host 504, the controller 506 or both.

The controller 506 retrieves the expected future cumulative reward associated with the current state, where the current state is retrieved from the sensor, from one or more Q tables stored in a relevant location of the one or more NVMs 508A-508N. Each of the one or more Q tables may be arranged on a page of the one or more NVMs 508-508N, where each wordline of the page is associated with one or more actions of one state, as described in FIG. 3. Because the calculations are performed in the controller 506, the relevant data entries may be stored in the volatile memory of the controller 506. After the controller 506 completes the calculations, such as the calculations described in FIG. 2, the respective Q table in the one or more NVMs 508A-508N is updated with the updated values from the calculations performed. The controller 506 then provides the host 504 with the action that may result in the max future reward. The controller 506 then advances to the next state, such that the sensor 502 provides the controller 506 with new state of the environment. For example, in the game depicted in FIG. 2, a first state may describe when the game chip 202 is in position (1,1) and a second state may describe when the game chip 202 is in position (1,2).

FIG. 5B is a schematic block diagram illustrating a data storage system architecture 550, according to one embodiment. The data storage system architecture 550 includes a sensor 552, a host 554, a controller 556, a plurality of CMOS logics 558A-558N, where each of the plurality of CMOS logics 558A-558N are coupled to a respective NVM of the plurality of NVMs 560A-560N. The CMOS logics 558A-558N represent control logic that is integrated with the respective NVM 560A-560N, such that some functions previously performed by the controller 556 may be performed by the CMOS logic 558. In one embodiment, the CMOS logic 558A-558N is CMOS by the Array. In another embodiment, the CMOS logic 558A-558N is CMOS under the Array (CuA). In yet another embodiment, the CMOS logic 558A-558N is CMOS bounded Array (CbA). The CMOS logic 558 is capable of performing at least the basic operations of summation, multiplication, argmax, and updating of the one or more Q tables stored in the NVMs 560. The sensor 552 provides the controller 556 with variables that define the current environment. As shown in FIG. 5B, the sensor 552 may be connected to either the host 554, the controller 556 or both.

The controller 556 passes the information to the relevant CMOS logic 558A-558N, such that the CMOS logic performs the basic operations (e.g., summation, multiplication, argmax, and updating of the one or more Q tables). Each of the basic operations may be the calculations described in FIG. 2. Because the CMOS logic may perform the previously mentioned operations for a large number of states in parallel, such as about 4,000 cells per die per plane, the data may be manipulated in the NVM, such that transferring the NVM data to the controller 556 is unnecessary. The CMOS logic 558 updates the one or more Q tables in the NVM 560 directly, with the relevant updated data.

Because the calculations are performed by the CMOS 558A-558N, where the CMOS 558A-558N is coupled to the relevant NVM 560A-560N, the calculations and the update of the data in the NVM 560A-560N may be quicker than transferring the data to a volatile memory location in the controller 556, performing the Q value calculations, and updating the NVM 560A-560N with the updated data. The controller 556 provides the host 504 with the action that may result in the max future cumulative reward based on the calculations performed by the CMOS 558A-558N. The controller 556 then advances to the next state, such that the sensor 502 provides the controller 556 with a new state of the environment. For example, in FIG. 2, a first state may describe when the game chip 202 is in position (1,1) and a second state may describe when the game chip 202 has moved from position (1,1) to position (1,2).

Figure 6:
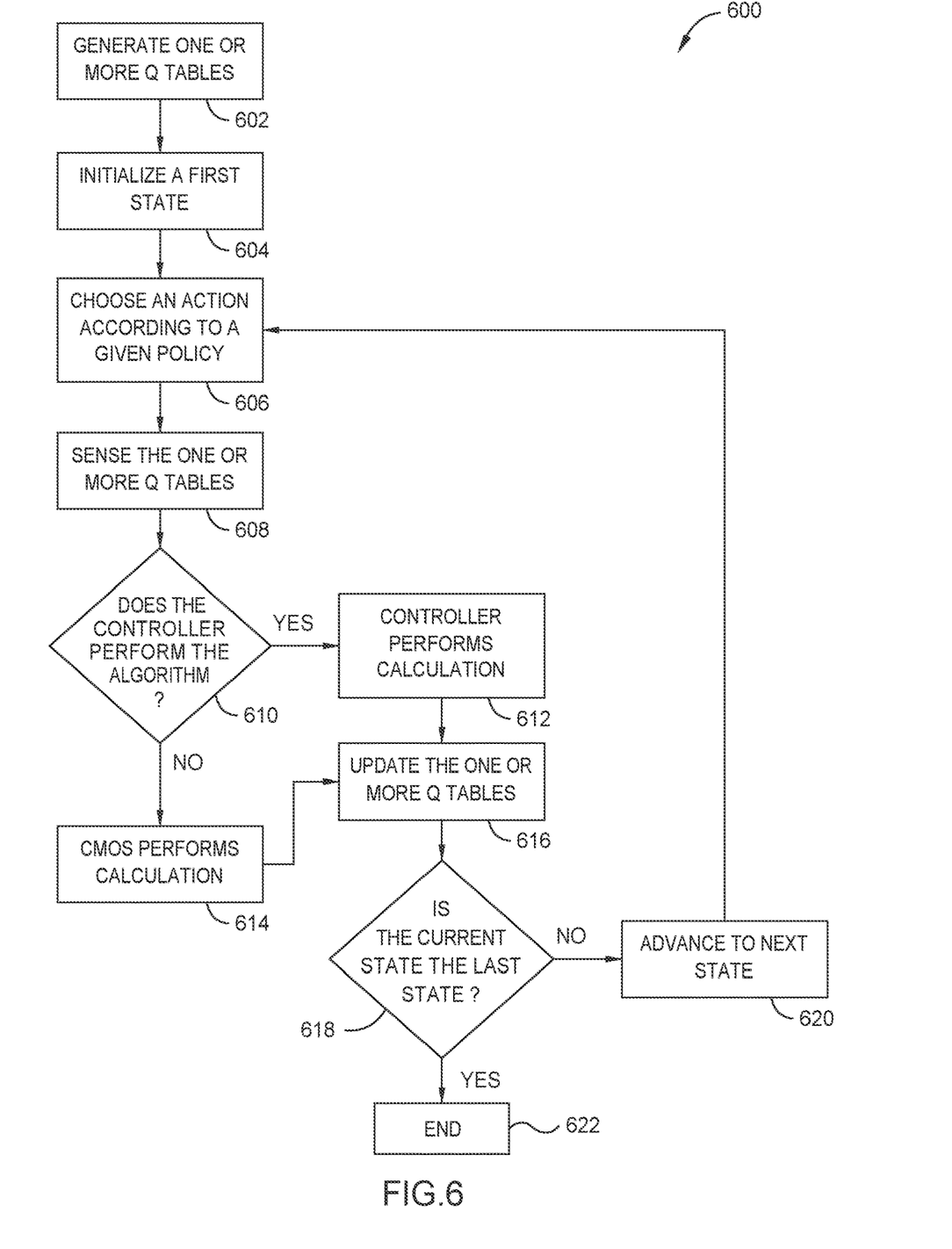
FIG. 6 illustrates a method for performing the reinforcement learning calculations and updating the one or more Q tables of the non-volatile storage unit, according to one embodiment.

FIG. 6 is a method 600 for performing the reinforcement learning calculations and updating the one or more Q tables of the non-volatile storage unit, according to one embodiment. At block 602, the controller, such as the controller 506 of FIG. 5A, or the CMOS array, such as the CMOS 558A-558N described in FIG. 5B, generates one or more Q tables, where each of the one or more Q tables includes one or more states and one or more actions for the one or more states. The one or more Q tables may have a two dimensional structure that includes a size, a location, and a resolution of each entry.

At block 604, the controller or the CMOS array initializes a first state of the one or more Q-tables after receiving data from a sensor, such as the sensor 502, 552 of FIGS. 5A-5B, for an environment. At block 606, the controller or the CMOS array chooses an action according to a given policy. At block 608, the one or more Q tables stored in the NVM are sensed. Because each state of the one or more Q tables may be stored along a wordline, such that a first state is stored on a first wordline, sensing the wordline senses all the actions for a first state of the one or more Q tables. In one embodiment, the one or more Q tables are located on a first plane, where the one or more Q tables are alternating. In another embodiment, the one or more Q tables are located on a first plane and on a second plane, where one of the one or more Q tables is located on a first plane and another of the one or more Q tables is located on a second plane. Each state of the one or more Q tables are located on a wordline of the plurality of wordlines.

At block 610, the calculations to update the Q tables for the current state may be completed by either the controller or the CMOS array, which includes CMOS by the Array, CuA, and CbA. If the controller performs the calculations, then the method 600 advances from block 610 to block 612. However, if the CMOS array performs the calculations, then the method 600 advances from block 610 to block 614.

After completing the calculations at either the controller at block 612 or at the CMOS array at block 614, the method 600 advances to block 616, where the one or more Q tables are updated with the calculated updated Q values from either the controller calculations at block 612 or the CMOS array calculations at block 614. At block 618, the controller determines if the current state completed is the last state in the environment. If the current state is not the last state in the environment, then at block 620, the controller advances the current state to the next state, such as from a first state to a second state. The second state may be on a second wordline of one or two planes, such that when sensing the second wordline, the one or more Q tables associated with the second state are sensed. After advancing to the next state at block 620, the controller chooses an action according to a given policy at block 606. However, if the current state is the last state at block 618, then at block 622, the method 600 ends.

By performing reinforcement learning algorithms, such as Q-learning and double Q-learning, at the non-volatile memory, the system efficiency may be improved, the performance may be accelerated, the learning curve may be shorted, and the overall power consumption be increasingly efficient.

In one embodiment, a data storage device includes a memory device and a controller coupled to the memory device. The controller is configured to receive Q table data from the memory device, execute a Q-learning algorithm to create updated Q table data, and write the updated Q table data to a Q table in the memory device.

The Q-table includes a first Q table and a second Q table that are arranged on a first wordline of a first page of a first plane of a first die of the memory device. The first Q table and the second Q table are alternating on the first wordline. The first Q table is arranged on the first wordline of the first page of the first plane of the first die and the second Q table is arranged on the first wordline of the first page of a second plane of the first die. The executing a Q-learning algorithm to create the updated Q-table data includes executing the following formula:

$$\text{Define } a^* = \text{argmax}_a Q^A(s',a)$$

$$Q^A(s,a) \leftarrow Q^A(s,a) + \alpha(s,a)[r + \gamma Q^B(s',a^*) - Q^A(s,a)]$$

where a* is the optimal action to be taken in the next step according to the first Q table ($Q^A$), where a is the action chosen at the current step, where s is the current state, where s' is the next state, where r is the immediate reward received in the current step, where γ is a discount factor, and where α(s,a) is a step size for the current state and the current action. The executing a Q-learning algorithm to create an updated Q-table data additionally comprises executing the following formula:

$$\text{Define } b^* = \text{argmax}_b Q^B(s',a)$$

$$Q^B(s,a) \leftarrow Q^B(s,a) + \alpha(s,a)[r + \gamma Q^A(s',a^*) - Q^B(s,a)]$$

where a* is the optimal action to be taken in the next step according to the second Q table ($Q^B$), where a is the action chosen at the current step, where s is the current state, where s' is the next state, where r is the immediate reward received in the current step, where γ is a discount factor, and where α(s,a) is a step size for the current state and the current action. The controller is further configured to advance to a second state of both the first Q table and the second Q table and read the data of the second state from both the first Q table and the second Q table.

In another embodiment, a data storage device includes a memory device, where the memory device is configured to read Q table data from the memory device, execute a Q-learning algorithm to create updated Q table data, and write the updated Q table data to the memory device. The data storage device further includes a controller coupled to the memory device.

The Q-table data and the updated Q-table data are stored on a same page of the memory device. The memory device includes CMOS by the Array, and wherein executing the Q-learning algorithm to create the updated Q-table data is performed in the CMOS by the Array. The memory device comprises CMOS under the Array (CuA), and wherein executing the Q-learning algorithm to create the updated Q-table data is performed by the CuA. The memory device comprises CMOS bounded Array (CbA), and wherein executing the Q-learning algorithm to create the updated Q-table data is performed by the CbA.

In another embodiment, a data storage device includes a memory device, means to generate one or more Q tables, wherein each of the one or more Q tables comprises one or more states and one or more actions, means to perform a max argument calculation for the one or more of the Q tables, means to update the one or more Q tables with the results of the max argument calculation, and means to advance to the next state of the one or more Q tables.

The means to update the one or more Q tables occurs on the same page of a first die. A first Q table of the one or more Q tables is generated on a first plane of the memory device and a second Q table of the one or more Q tables is generated on a second plane of the memory device. The first Q table and the second Q table of the one or more Q tables are generated on a common wordline, where sensing the common wordline senses both the first Q table and the second Q table. The structure of the one or more Q tables is a two dimensional structure stored in the memory device, wherein the two dimensional structure includes a size, a location, and a resolution of each entry for the one or more Q tables. The means to perform a max argument calculation is distinct from the memory device. The means to perform a max argument calculation is an integral part of the memory device. The means to perform the max argument calculation performs the following calculation:

$$Q(s_t, a_t) \leftarrow Q(s_t, a_t) + \alpha[r_{t+1} + \gamma \, \text{argmax} \, Q(s_{t+1},a) - Q(s_t, a_t)]$$

where s is the current state, where a is the current action, where Q(s,a) is the max Q table value for all current states and actions, where r is the reward for the current action for the current state, and where γ is a discount factor.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a non-volatile memory (NVM) device; and
   a controller coupled to the NVM device, wherein the controller is configured to:
     receive Q table data from the NVM device;
     execute a Q-learning algorithm to create updated Q table data;
     write the updated Q table data to a first Q table or a second Q table in the NVM device, wherein:
       all actions associated with a state of one or more states of the first Q table and the second Q table are generated on a same wordline of the NVM device; and
       on the same wordline, each action of the state of the first Q table and each action of the state of the second Q table are alternating; and
     read the same wordline of the NVM device, wherein reading the same wordline senses all actions associated with the state of the one or more states of the first Q table and the second Q table.

2. The data storage device of claim 1, wherein the Q table comprises a first Q table and the second Q table are arranged on a first wordline of a first page of a first plane of a first die of the NVM device.

3. The data storage device of claim 1, wherein the first Q table is arranged on a first wordline of a first page of a first plane of a first die and the second Q table is arranged on a first wordline of a first page of a second plane of the first die.

4. The data storage device of claim 1, wherein executing a Q-learning algorithm to create the updated Q table data comprises executing the following formula:

$$\text{Define } a^* = \text{argmax}_a Q^A(s',a)$$

$$Q^A(s,a) \leftarrow Q^A(s,a) + \alpha(s,a)[r + \gamma Q^B(s',a^*) - Q^A(s,a)]$$

where a* is the optimal action to be taken in the next step according to the first Q table ($Q^A$), where a is the action chosen at the current step, where s is the current state, where s' is the next state, where r is the immediate reward received in the current step, where γ is a discount factor, and where α(s,a) is a step size for the current state and the current action.

5. The data storage device of claim 4, wherein executing a Q-learning algorithm to create the updated Q table data additionally comprises executing the following formula:

$$\text{Define } b^* = \text{argmax}_b Q^B(s',a)$$

$$Q^B(s,a) \leftarrow Q^B(s,a) + \alpha(s,a)[r + \gamma Q^A(s',a^*) - Q^B(s,a)]$$

wherein a* is the optimal action to be taken in the next step according to the second Q table ($Q^B$), wherein a is the action chosen at the current step, wherein s is the current state, wherein s' is the next state, wherein r is the immediate reward received in the current step, wherein γ is a discount factor, and wherein α(s,a) is a step size for the current state and the current action.

6. The storage device of claim 5, wherein the controller is further configured to:
 advance to a second state of both the first Q table and the second Q table; and
 read the data of the second state from both the first Q table and the second Q table.

7. A data storage device, comprising:
 a non-volatile memory (NVM) device, wherein the NVM device is configured to:
  read a wordline of the NVM device, wherein reading the wordline senses all actions associated with a state of one or more states of a first Q table and a second Q table;
  execute a Q-learning algorithm to create updated Q table data; and
  write the updated Q table data to the first Q table or the second Q table in the NVM device, wherein:
   all actions associated with a state of one or more states of the first Q table and the second Q table are generated on a same wordline of the NVM device; and
   on the same wordline, each action of the state of the first Q table and each action of the state of the second Q table are alternating; and
 a controller coupled to the NVM device.

8. The data storage device of claim 7, wherein the first or second Q table data and the updated Q table data are stored on a same page of the NVM device.

9. The data storage device of claim 7, wherein the NVM device comprises CMOS by the Array, and wherein executing the Q-learning algorithm to create the updated Q table data is performed in the CMOS by the Array.

10. The data storage device of claim 7, wherein the NVM device comprises CMOS under the Array (CuA), and wherein executing the Q-learning algorithm to create the updated Q table data is performed by the CuA.

11. The data storage device of claim 7, wherein the NVM device comprises CMOS bounded Array (CbA), and wherein executing the Q-learning algorithm to create the updated Q table data is performed by the CbA.

12. A data storage device, comprising:
 a non-volatile memory (NVM) device;
 means to generate one or more Q tables, wherein:
  each of the one or more Q tables comprises one or more states,
  a first state of a first Q table and a first state of a second Q table of the one or more Q tables are generated on a wordline of the NVM device,
  all actions associated with the first state of the first Q table and the first state of the second Q table are generated on the wordline, and
  on the wordline, each action of the first state of the first Q table and each action of the first state of the second Q table are alternating;
 means to sense the wordline, wherein sensing the wordline senses all the data for the first states of the first Q table and the second Q table;
 means to perform a max argument calculation for the one or more of the Q tables;
 means to update the one or more Q tables with the results of the max argument calculation; and
 means to advance to the next state of the one or more Q tables.

13. The data storage device of claim 12, wherein the means to update the one or more Q tables occurs on the same page of a first die.

14. The data storage device of claim 12, wherein the first Q table of the one or more Q tables is generated on a first plane of the NVM device and the second Q table of the one or more Q tables is generated on a second plane of the NVM device.

15. The data storage device of claim 12, wherein the structure of the one or more Q tables is a two dimensional structure stored in the NVM device, wherein the two dimensional structure comprises a size, a location, and a resolution of each entry for the one or more Q tables.

16. The data storage device of claim 12, wherein the means to perform a max argument calculation is distinct from the NVM device.

17. The data storage device of claim 12, wherein the means to perform a max argument calculation is an integral part of the NVM device.

18. The data storage device of claim 12, wherein the means to perform the max argument calculation performs the following calculation:

$$Q(s_t,a_t) \leftarrow Q(s_t,a_t) + \alpha[r_{t+1} + \gamma \mathrm{argmax} Q(s_{t+1},a) - Q(s_t,a_t)]$$

wherein s is the current state, wherein a is the current action, wherein Q(s,a) is the max Q table value for all current states and actions, wherein r is the reward for the current action for the current state, and wherein γ is a discount factor.

* * * * *